Figure 1:
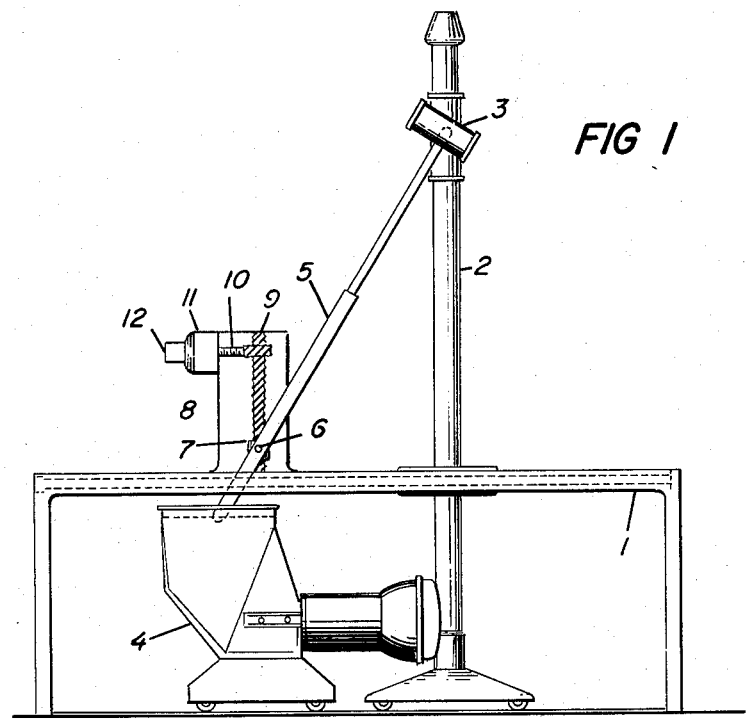

Sept. 20, 1960 W. GÜNTERT 2,953,683
PHOTOFLUOROGRAPHIC CAMERA
Filed July 10, 1958

INVENTOR
Walter Güntert by Wenderoth, Lind & Ponack
ATTORNEYS

United States Patent Office 2,953,683
Patented Sept. 20, 1960

2,953,683

PHOTOFLUOROGRAPHIC CAMERA

Walter Güntert, Aarau, Switzerland, assignor to N.V. Optische Industrie "De Oude Delft," Delft, Netherlands Filed July 10, 1958, Ser. No. 747,734

Claims priority, application Netherlands July 16, 1957

1 Claim. (Cl. 250—65)

During the taking of X-ray photographs, whether by direct radiography or by means of a photo-fluorographic camera, particulars of the patient or of the picture taken are usually recorded on the film in order to prevent confusion of the different photographs. In the case of direct radiographs this is achieved by the use of lead numerals or similar entities which, being stuck on the cassette during exposure, are reproduced as X-ray shadows on the radiographic film. When a photo-fluorographic camera is used the desired identification marks must by some means or other be rendered visible in the object plane of the camera, i.e. the plane of the fluorescent screen, so as to be reproduced by the camera as a well-defined image on the film. For this purpose several methods are conceivable and are actually applied in practice. According to one of these methods lead markings are placed before the fluorescent screen and are therefore reproduced as shadows on the screen. This method, besides being cumbersome, has the drawback that the quality of the image obtained depends to a large extent upon the object to be examined and upon the variable radiation dose used for the X-ray photographs.

Moreover, in tomographic work in which the height of the pictured layer of tissue has to be marked on the pictures taken, this method is impracticable if, as is frequently the case, the camera used has a cylindrically curved fluorescent screen. As the front plate of the camera, designed as an anti-diffusion grid, is situated some distance in front of the screen, motion blur occurs in the reproduction of the identification marks as a result of the tomographic movement. Another well-known method consists in projecting the desired identification marks in the plane of the fluorescent screen by means of an optical system mounted in the hood of the camera. The feature is also known of placing the identification marks on a transparent holder that can be mounted in a window of the fluorescent screen and be illuminated with transmitted light. One drawback of these known methods is that the process of changing the identification marks, which may for instance be in card form, is comparatively difficult and lengthy and is found particularly cumbersome when, for instance, it is necessary to indicate the sequence of exposure of a series of fluorographs taken in rapid succession or the height of the stratum in the case of a series of tomographic pictures.

The object of the invention is to specify a marking device for use with a photo-fluorographic camera which has a plane anti-diffusion grid and behind it a fluorescent screen curved cylindrically in the direction of the film surface, such marking device being very simple in construction and manipulation and not projecting in an inconvenient manner outside the camera. The device is pre-eminently adapted for effecting automatic change of the identification marks, for instance under the control of the film conveyance mechanism or of the appliances in a tomograph for adjustment of the height of stratum to be photographed.

According to the invention a rotatable drum whose axis of rotation is parallel to the generatrices of the fluorescent screen and whose wall bears markings is interposed in the space between the fluorescent screen and the anti-diffusion grid this drum having a built-in light-source controlled by the switchgear of the X-ray apparatus, whilst the fluorescent screen is provided with a window, the arrangement being such that during the taking of fluorographic pictures the desired marking is simultaneously photographed by the camera. A device for indicating the depth of stratum adjustment during tomography is shown in the drawing as an embodiment of the invention.

Fig. 1 gives an outline drawing of the tomograph.

Figure 2:
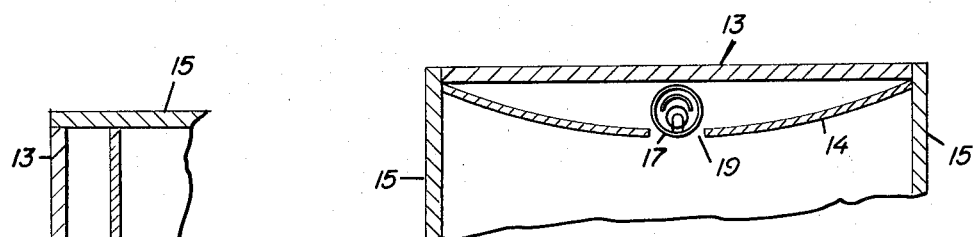
Figure 3:
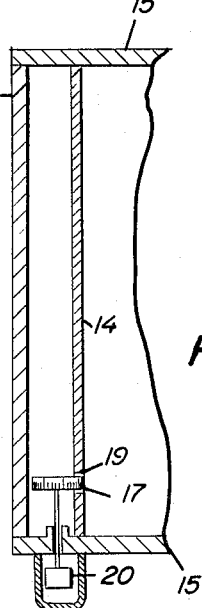

Fig. 2 and 3 are sections of a portion of the camera hood, which sections are perpendicular to each other.

Item 1 in Fig. 1 is the table for the patient, 2 the movable stand for the X-ray tube 3, whilst 4 is the photofluorographic camera, also movable, which is positioned under the table. The X-ray tube 3 is joined to the camera 4 by the telescoping rod 5. Rod 5 makes a swinging movement about point 6, at which point the rod is fixed to a nut 7. This nut can be shifted vertically in position by means of a threaded rod 8 which is driven by a motor 11 via an endless screw 10 with worm wheel 9. The screwing upward or downward of nut 7 varies the position of the directional point 6 of the X-ray tube 3 in the usual manner and thus varies the height of the tomographed stratum above the table 1. As the tomographic principle is universally known, the operation of the apparatus shown in Fig. 1 will not be further detailed in this specification.

Fig. 2 gives a section of a portion of the camera hood situated perpendicular to the generatrices of the cylindrically curved fluorescent screen, whilst Fig. 3 shows an axial section parallel to the generatrices. A rotatable drum 16, which may be made either of transparent or opaque material and has markings in the form of a graduated scale, is interposed in the space between the plane anti-diffusion grid 13 situated at the end of the hood 15 and the cylindrically curved fluorescent screen 14. Mounted inside the drum is a small lamp 17 with a reflector 18, which lamp can light up during photofluorography and, by being supplied with current from, say, a charged condenser, will invariably project the same amount of light on to the film via the drum 16 and a window 19 in the fluorescent screen, so that the identification marks will always receive a constant illumination irrespective of the photo-fluorographic exposure.

The portion of the drum it is desired to reproduce is positioned in the plane of the screen and is accordingly reproduced as a sharply defined image on the film.

In the embodiment taken as example the height of the tomographed stratum is automatically set in the drum by means of an electrical transmitter 12 which is coupled with the adjusting motor 11 and which governs a receiver 20 on the spindle of the drum. If a second transmitter is added which is installed for instance in the control cabin and is provided with an indicator device, and if the switch of the height-adjusting motor 11 is also fitted in this cabin, there is no need for the technical personnel to leave the ray-projected control room at any time throughout the entire cycle of exposures.

In a simpler form of installations it is, however, possible to fit the drum spindle outside the camera with a small handwheel or similar device which, with the aid of a graduated scale, can be set in accordance with the height adjusted on the tomograph.

What I claim is:

A photo-fluorographic camera comprising a light-tight hood, an optical system in said hood, a plane anti-diffusion panel closing said hood at its end nearest to the X-ray tube, a fluorescent screen with curved edges in said hood adjacent said panel having a cylindrical curvature which is concave toward said panel to define a cylindrical segment-shaped space between said panel and said screen, said screen having an aperture adjacent the middle of one of its curved edges, a rotatable cylindrical drum mounted in said segment-shaped space opposite said aperture having its axis of rotation parallel to said fluorescent screen so as to have a part of its circumference in said aperture substantially in alignment with said fluorescent screen, said drum carrying a plurality of indicia along its circumference, a light source in said drum controllable by the X-ray apparatus to illuminate transparently the indicia on the part of said drum in said aperture, and means responsive to a desired function for rotating said drum to a desired position.

References Cited in the file of this patent
UNITED STATES PATENTS

| | | |
|---|---|---|
| 2,248,976 | Files | July 15, 1941 |
| 2,331,225 | Powers | Oct. 5, 1943 |
| 2,433,129 | Land | Dec. 23, 1947 |
| 2,560,085 | Clausing | July 10, 1951 |
| 2,595,430 | Tuttle et al. | May 6, 1952 |
| 2,858,446 | Parish | Oct. 28, 1958 |